Aug. 16, 1949.　　　K. W. GRAYBILL　　　2,479,231
ALTERNATING CURRENT RELAY
Filed June 6, 1945
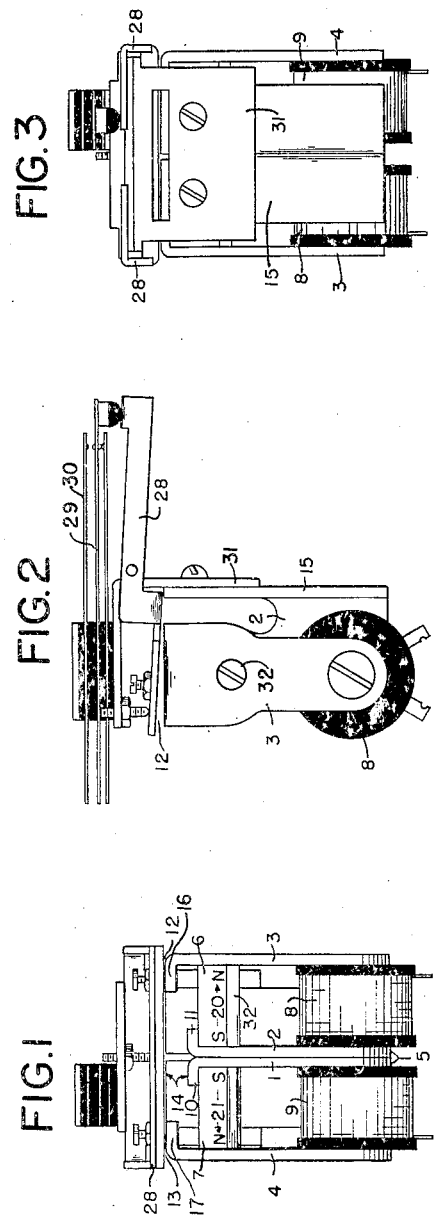
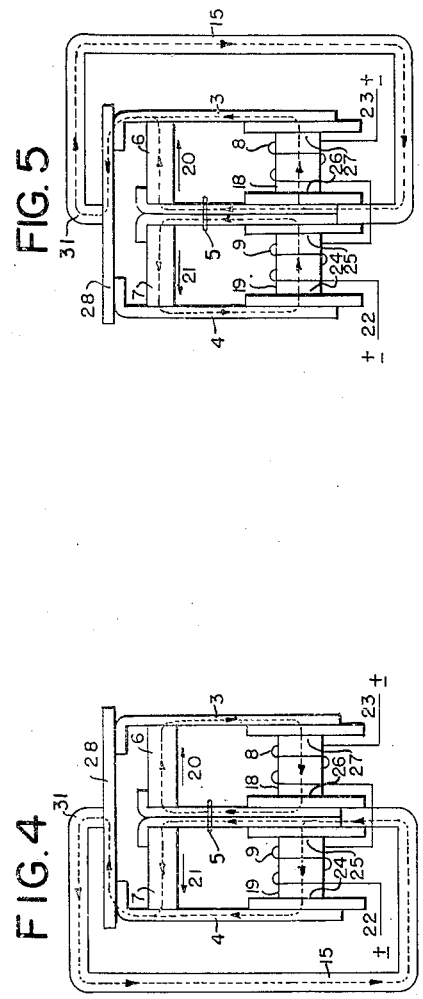
INVENTOR.
KENNETH W. GRAYBILL
BY
ATTORNEY Patented Aug. 16, 1949

2,479,231

UNITED STATES PATENT OFFICE 2,479,231

ALTERNATING CURRENT RELAY

Kenneth Wayne Graybill, Elmhurst, Ill., assignor to Automatic Electric Laboratories, Inc., Chicago, Ill., a corporation of Delaware Application June 6, 1945, Serial No. 597,818

1 Claim. (Cl. 175—338)

This invention relates to alternating current relays and more particularly to a relay which maintains a constant pull on the armature during the reversal of the current. Heretofore a reversal of polarity at the armature occurred during each reversal of the current which, on occasions, produced a condition known as "chattering."

It is an object of this invention to provide a relay which can be operated on an alternating current circuit and maintain a constant pull at the armature.

Another object is to provide a relay in which polarity at the armature will not reverse when operated on an alternating current circuit and therefore will operate efficiently as an alternating current impulsing relay.

This is accomplished by a novel construction in which permanent magnets are employed in the relay structure to provide a permanent flux, this being in addition to the electromagnetic flux which would be present when the winding of the relay is energized.

One method of construction is described hereunder, reference being made to the accompanying drawings, which comprise 5 figures on 1 sheet.

Figure 1 is a front view of a relay structure having three principal vertical members, two permanent magnets, two electromagnetic coils and an armature.

Figure 2 is a side view taken from the right side of Figure 1 showing the vertical branch of the center member and a further member forming a mounting place for the armature and the spring contact pile-up.

Figure 3 is a view from the rear, showing the side members and the center member and the arrangement for mounting the armature.

Figure 4 is a diagrammatic view to show one path of the magnetic flux which is produced by the flow of alternating current.

Figure 5 is a diagrammatic view to show another path of the magnetic flux which is produced by the flow of alternating current.

This relay is of unique construction, comprising four parallel iron plate members. The two center plates 1 and 2 as shown in Figure 1 are permanently fitted together to form the center member 5 and plates 3 and 4 constitute the two outside members. It will be noted in Figures 2 and 3 that plates 1 and 2 are extended to the rear and then extend outward to form the heel piece 15 and together with member 31 provide a suitable mounting for the armature 28. Also it will be seen in Figures 2 and 3 that the member 31 provides mounting space for the contact spring pile-up. The inner ends 10 and 11, as seen in Figure 1, of the plates 1 and 2 respectively, are cut shorter than ends 16 and 17 of the side members 3 and 4 and also ends 10 and 11 are turned away from the center line, thus increasing the air gap 14 between the ends 10 and 11 and the armature 28, to a distance several times greater than the air gaps 12 and 13 between the armature 28 and the ends 16 and 17 of the two side members 3 and 4.

Two small permanent magnets 6 and 7, have been provided and mounted in the positions shown in Figure 1. It will be noted that south poles of these magnets 6 and 7 are attached to the opposite sides of the center member 5 and are placed close to the top ends 10 and 11 of the plates 1 and 2. The north poles of magnets 6 and 7 are adjacent to the inside surfaces of plates 3 and 4 respectively as shown in Figure 1. The plates 1, 2, 3 and 4 and magnets 6 and 7 are clamped together by screw 32. As the plates 3 and 4 are longer than plates 1 and 2 and the lower ends of all four plates are in the same plane, the top ends 16 and 17 of the plates 3 and 4 are closer to the armature 28, with the result that the air gaps 12 and 13 are approximately one third the size of air gap 14. As the center member is a south pole and this member forms a part of the heel piece 15, upon which the armature 28 is mounted with practically no air gap between armature 28 and heel piece 15, the armature 28 is also a south pole. As the north pole of permanent magnet 7 is attached to plate 4 and the north pole of permanent magnet 6 is attached to plate 3, the top ends 16 and 17 of plates 3 and 4 are also north poles.

Near the lower ends of plates 1, 2, 3 and 4 two electromagnetic coils 8 and 9 have been mounted and it will be noted that the soft iron cores 18 and 19 as seen in Figures 4 and 5 are fixed between the plates 2 and 3, and 1 and 4 respectively. When there is no current flowing in the windings of coils 8 and 9, and the air gaps 12 and 13 are at their maximum as shown in Figure 1, two complete magnetic circuits may be traced in Figure 1, as follows. First, from the north pole of permanent magnet 6, in the direction of the arrow 20, thence down the outside member 3, through the electromagnetic core 18, up through the center member 5 to the south pole of permanent magnet 6, and second, from the north pole of permanent magnet 7, in the direction of the arrow 21, down the outside member 4, through the electromagnetic core 19, up through center member 5 to the south pole of permanent magnet 7. A part of the flux from the north pole of permanent magnet 6 will pass up through the upper part of plate 3 to the end 16 causing this end to become slightly north. Likewise from the north pole of permanent magnet 7, a part of the flux will pass up through the upper part of plate 4 to end 17, causing this to become slightly north. As armature 28 is connected through member 31 and the heel piece 15 to the center member 5, as seen in Figures 1 and 2, that is the south pole of both permanent magnets 6 and 7, the pivoted armature 28 is a south pole and will tend to move to close the air gaps 12 and 13. This is prevented by the tension of the armature spring 29 shown in Figure 2. Thus the normal position of the armature 28, when no current is flowing in the electromagnetic coils 8 and 9, is as shown in Figures 1 and 2. The contact springs 29 and 30, shown in Figure 2, are not made and the air gaps 12 and 13 are at their maximum.

Should an alternating current be connected to terminals 22 and 23, as shown in Figures 4 and 5, the magnetic flux set up in the cores 18 and 19 of the electromagnetic coils 8 and 9 will be, first in one direction and then in the opposite direction, that is, the direction of flow of the electromagnetic flux will alter on each half cycle of the alternating current. At one instant the polarity of end 24 of core 19 will be north, core end 25 will be south, likewise end 26 of core 18 will be north and core end 27 will be south. The electromagnetic flux generated by coil 9 will flow, refer to Figure 4, from north pole of core 19 up through the member 4, armature 28, member 31, seen in Figures 3 and 4, and heel piece 15 to the center member 5 and south end of core 19. A multiple path of flux will be observed where the returning flux enters the center member 5 from the heel piece. This flux divides, a portion passing through core 19 and another portion passing up through the center member 5 and through the permanent magnet 7, in the direction of the arrow 21, to again join the other portion which passes up through the outside member 4. This flux will be augmented by the flux of permanent magnet 7. It will be observed by reference to Figure 4 that, at this instant, the flux in core 18 is in the opposite direction to the flux in permanent magnet 6 and therefore these form a series magnetic circuit which does not pass through the armature 28, member 31 and heel piece 15. This magnetic circuit can be traced from end 26 of core 18, which at this instant is a north pole, up through the center member 5, through permanent magnet 6, in the direction of arrow 20, down through number 3 to end 27 of core 18. A similar effect takes place when the current reverses. In this case, as shown in Figure 5, the flux from the north end of core 18 will pass up through member 3, the armature 28, member 31 and heel piece 15 to the center member 5 and back to end 26 of core 18. A multiple flux path is also present, see Figure 5, which can be traced from the point where the electromagnetic flux divides near end 26 of core 18, thence up through the center member 5, to the south end of permanent magnet 6 and through this magnet to join the first path, thus the flux of permanent magnet 6 augments the electromagnetic flux of core 18. It will be noted that the polarity has not changed at the armature and due to the effect of the permanent magnets there is a constant pull on the armature. Again, it will be observed, by reference to Figure 5, that due to the reversal of current the flux in core 19 is in the opposite direction to the flux in permanent magnet 7 and therefore these form a series magnetic circuit which does not pass through the armature 28, member 31 and heel piece 15. This local magnetic circuit can be traced from end 25 of core 19, which at this instant is a north pole, up through the center member 5, through permanent magnet 7 in the direction of the arrow 21, down through member 4 to end 24 of core 19.

Having described the features of this invention, what is considered to be new and desired to have protected by Letters Patent will be pointed out in the appended claim.

What is claimed is:

An alternating current relay comprising three parallel iron members having one end of each in the same plane, an iron extension to the center one of said members to form a heel piece for said relay, the other end of each outside member extending beyond the other end of the center member to form separate pole pieces, an armature pivotally mounted on said heel piece, two permanent magnets having their like poles attached to opposite sides of the center member near its other end and each opposite pole attached to one of the said outside members near their said other ends, two electromagnetic coils on two cores and each coil and its core mounted on opposite sides of said center member near its one end, the other ends of each of said cores respectively attached to respective ones of the said outside members, said permanent magnets, said cores and said members forming magnetic circuits having a flux flowing therein, said outside members with their pole pieces, said cores, said armature, and said heel piece with a portion of said center member forming another magnetic circuit, said coils being wound and connected in such manner as to produce mutually aiding fluxes in the cores upon which they are wound but zero resultant flux in the center member whereby alternating current flowing through said electromagnetic coils will vary the flux in said first magnetic circuits to produce a flux in said other magnetic circuit to thereby operate said armature.

KENNETH WAYNE GRAYBILL.

REFERENCES CITED

The following references are of record in the file of this patent:

UNITED STATES PATENTS

| Number | Name | Date |
| --- | --- | --- |
| 409,675 | Field | Aug. 27, 1889 |
| 970,180 | Burnett | Sept. 13, 1910 |
| 1,847,339 | Freeman | Mar. 1, 1932 |
| 2,301,992 | Agnew | Nov. 17, 1942 |
| 2,307,922 | Dickten | Jan. 12, 1943 |
| 2,338,566 | Badgely | Jan. 4, 1944 |
| 2,355,543 | Martin | Aug. 8, 1944 |

FOREIGN PATENTS

| Number | Country | Date |
| --- | --- | --- |
| 544,212 | Germany | Feb. 15, 1932 |
| 779,987 | France | Jan. 24, 1935 |